United States Patent [19]

Thompson

[11] 4,247,183
[45] Jan. 27, 1981

[54] MICROFILM CASSETTE

[75] Inventor: Robert W. Thompson, Pokegama Township, Pine County, Minn.

[73] Assignee: Minnesota Mining and Manufacturing Company, St. Paul, Minn.

[21] Appl. No.: 62,620

[22] Filed: Aug. 1, 1979

[51] Int. Cl.³ .................... G03B 17/26; G03B 23/12
[52] U.S. Cl. .................... 353/26 R; 352/78 R; 353/95; 353/122; 354/275
[58] Field of Search ............. 353/26 R, 95, 122, 120; 352/78 R; 354/275

[56] References Cited

U.S. PATENT DOCUMENTS

| 2,700,917 | 2/1955 | Peters et al. | 353/96 |
| 3,498,707 | 3/1970 | Allen | 353/26 R |
| 3,679,298 | 7/1972 | Knowles et al. | 353/95 |
| 3,700,321 | 10/1972 | Peters | 353/26 R |
| 3,841,745 | 10/1974 | Kaye | 353/26 R |
| 3,844,642 | 10/1974 | Peters | 352/78 R |
| 3,854,804 | 12/1974 | McMaster | 352/78 R |
| 4,203,657 | 5/1980 | Peters | 353/26 R |

Primary Examiner—Steven L. Stephan
Attorney, Agent, or Firm—Cruzan Alexander; Donald M. Sell; John C. Barnes

[57] ABSTRACT

A microfilm cassette for use in an optical projection device in which a film plane is established within the cassette by a film platen supported by the cassette. An additional aspect of this film platen is its support structure which enables it to move transversely with respect to the cassette. A predetermined surface on this film platen is biased against a predetermined surface within the projection device to establish and control the relationship between the film plane and the projection device's optics.

5 Claims, 4 Drawing Figures

MICROFILM CASSETTE

The present invention relates to an improved microfilm cassette for use in an optical projection device, and in one aspect, to an improved cassette which establishes and positions a film plane within the cassette with respect to a focal plane within the projection device.

The prior art discloses many types of cassettes usable with microfilm projection devices. One important component discussed within this art is the structure provided to esablish a film plane and control the relationship of this film plane to the focal plane of the optics associated with the projection device in which the cassette is to be used. If a controlled film plane is not established, considerable difficulty is encountered in achieving and maintaining a focussed image within the projection device. A common method of providing this controlled film plane is the utilization of structure to establish a fixed film plane within the projection device and then providing an adjustment mechanism also within the projection device to afford an adjustment of the relationship between the projector's optic focal plane and the fixed film plane. This method leads to increased complexity within the projection device and with its assembly. Increased efficiency and reduction in cost can be achieved if this controlled film plane can be established during the manufacture of the cassette rather than during the assembly of the projection device.

SUMMARY OF THE INVENTION

The microfilm cassette of the present invention provides a convenient supply of microfilmed segments of information to an optical projection device, and in doing so, establishes a film plane within the cassette rather than within the projector. The cassette comprises a molded polymeric housing having wall portions and base portions forming a first and second storage chamber with an interconnecting passageway, and a removable cover. The storage chambers contain rotatable spools which can be driven through the housing to bi-directionally advance microfilm wound onto the spools from one storage chamber to the other.

In passing between the storage chambers the microfilm transits the interconnecting passageway of the housing. This passageway is comprised of wall portions which are truncated to define an opening affording the transmission of light through the cassette's housing and through the film transiting therein. The wall portions of the passageway also contain slots, the function of which will be described later.

A film platen assembly, used to establish a film plane within the cassette, is positioned between and movable with respect to the wall portions of the passageway. The film platen assembly includes a bracket member having parallel end portions and an interconnecting side portion. The end portions each have a longitudinal slot through which the microfilm transits. As the microfilm transits the bracket member it passes generally parallel to and adjacent the side portion of the bracket. The side portion contains a centrally located aperture disposed to pass light coming through the opening in the passageway and thus allow the illumination of the informational segments on the microfilm transiting therein. The side portion also contains a pair of tabs extending outwardly from the bracket. These tabs pass through the previously described slots in the wall portions of the passageway to position the bracket member but are free to slide in the slots. In this manner the bracket member is supported for sliding or floating movement transversely of the passageway within the cassette housing and can be moved within the housing by appropriate movement of the extending tabs.

Mounted to the inside surface of the side portion of the bracket member is a glass plate assembly. The glass plate assembly comprises two glass plates spaced apart from each other by sections of an adhesive-coated strip material having a predetermined thickness, preferably 0.0025 inch in excess of the thickness of a given microfilm. This spacing of the glass plate assembly defines the film plane by accurately positioning the microfilm between the glass plates within the bracket member.

This invention is further designed to include an accurate surface, having a known orientation with respect to the film plane, provided on the film platen assembly. This accurate surface is positioned against a second accurate surface having a known orientation with respect to the focal plane of the optics, and an optical center-line within a projection device. With this design the relationship between the film plane and the focal plane of the optics can be simply and effectively controlled, and this control can be repetitively achieved without complex adjustment of the projector's optics.

DESCRIPTION OF THE ACCOMPANYING DRAWING

The present invention will be further described hereinafter with reference to the accompanying drawing wherein.

DETAILED DESCRIPTION OF THE PREFERRED EMBODIMENT

Figure 1:
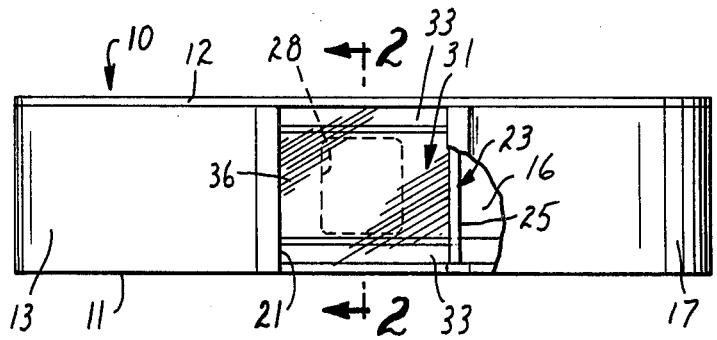
FIG. 1 is a front view of the cassette according to the present invention with a fragment of the housing broken away to show the interior parts.

Referring now to the drawing, the cassette 10 of this invention is preferably formed of a polymeric housing having wall portions forming first and second storage chambers 13 and 17, respectively, and a passageway 20 connecting the storage chambers 13 and 17. The housing also has a base portion 11 and a cover 12. Located within the storage chambers 13 and 17 are spools 14 and 18, respectively. These spools 14 and 18 are the takeup and supply spools for a length of microfilm 16 which is wound upon the spools 14 and 18. The spools 14 and 18 are adapted to contain a bore with splines 19 to afford their rotation in both the clockwise and counterclockwise directions, thus winding or unwinding the length of film 16. This rotation is accomplished by extending drive shafts (not shown) within the projection device (not shown) to engage and drive the bore with splines 19. The film 16 has an inherent resilience, tending to rotate and thus unwind the film 16 on the spools 14 and 18. To prevent this, friction dics 15 are placed between the spools 14 and 18 and the base portion 11 of the housing so as to afford a retarding force against the rotation of the spools 14 and 18 due to the resilience of the film 16.

The wall portions 21 forming the interconnecting passageway 20 for the film 16 are truncated to afford an opening through which the light of the projection device (not shown) can illuminate the film 16.

The film 16 is supported in this passageway 20 by a film platen assembly 23 slidably mounted within slots 22, existing in the truncated wall portion 21. The film platen assembly 23 consists of a bracket member 24 having parallel end portions 25 connected by a side portion 27. The parallel end portions 25 each have a longitudinal slot 26 through which the film transits. In doing so, the film 16 passes generally parallel to the side portion 27 which contains an aperture 28, sized and disposed so as to frame a segment of the information contained on the microfilm 16 and allow light to pass through the framed segment. The side portion 27 also has tabs 29 projecting away from the bracket member 24 disposed to engage the slots 22 described above. The glass plate assembly 31 comprises a pair of glass plates 32 which are separated by two strips of adhesive tape 33 of a predetermined thickness preferably between 0.005–0.008 inch. This spacing provides an opening 34 in excess of the film thickness, preferably of 0.0025 inch. For example with a film thickness of 0.005 inch the preferred spacing is 0.006 to 0.008 inch allowing the film 16 to pass between the glass plates 32 but affording close enough contact by the glass plates 32 with the film 16 to establish a film plane within the cassette 10.

In addition to establishing a film plane the glass plates 32 can be coated to provide certain functions generally required within a projection device. In the preferred embodiment a wide band hot mirror coating has been applied to surface 35 of the glass plate assembly 31. This coating diminishes the heat due to the projection lamp from transferring through the glass plates 32 and potentially degrading the film 16. An anti-reflection coating is also applied to surfaces 36. This coating affords a diminition of any prismatic coloration fringes generally present in the illumination system.

Figure 2:
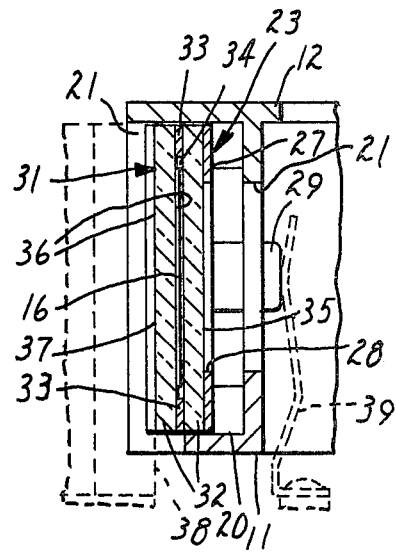
FIG. 2 is a transverse sectional view taken along the lines 2—2 of FIG. 1 wherein the structure of the projection device retaining the cassette is also shown by dotted line.
Figure 3:
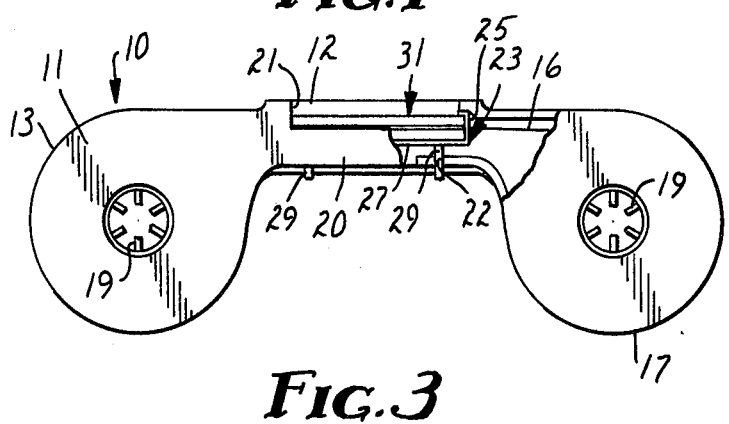
FIG. 3 is a bottom view of the cassette with a fragment of the cover broken away to show the interior parts.
Figure 4:
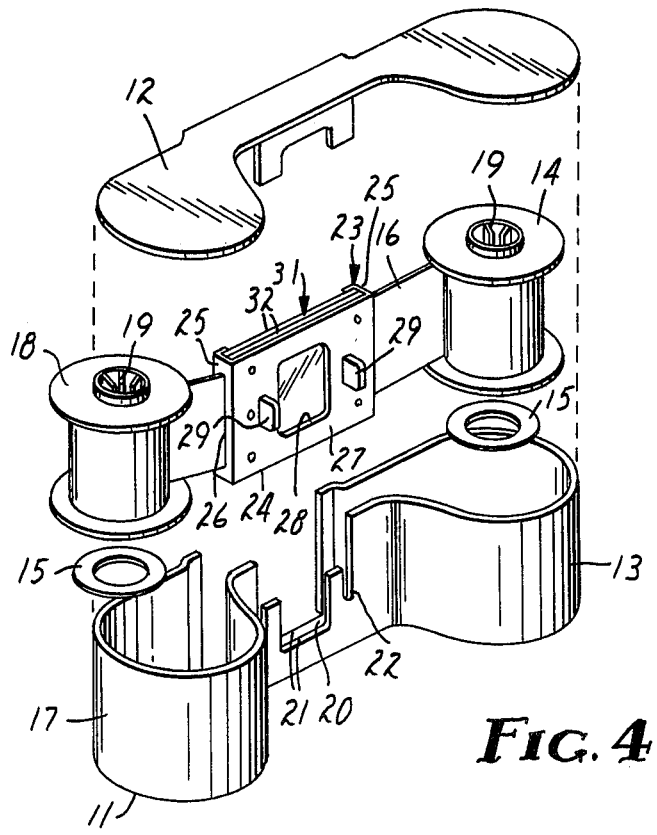
FIG. 4 is an expanded perspective view of the cassette showing the orientation of the interior parts.

One aspect of this cassette 10 having specific application within a projection device is a predetermined surface 37 on the film platen assembly 23. Through tolerance control during the manufacture of the components of the film platen assembly 23, this surface is designed to insure parallelism and a spacing within a tolerance 0.003 inch with respect to the film plane. This surface 37 can be used to orient the film plane to be perpendicular with respect to a center-line of the projection device's optics. This process is greatly simplified if a mounting surface within the projector is also predetermined as for example by precision machining to a fixed orientation with respect to the projection device's optics. Given this structure, the cassette can be inserted into the projection device as shown in FIG. 2, with the flat surface 37 of plate 32 inserted against the precision mounting surface 38 of the projection device. Spring clips 39 in the projection device are used to bias the tabs 29 of the cassette 10 and thus the film platen assembly 23 against this mounting surface 38 so as to automatically establish the orientation of the film plane within the cassette to be parallel to the surface 38 of the projector and to be perpendicular to the optic axis thereof. This aspect of the cassette can be used to simplify the structure of an associated projection device (not shown).

Having thus described a preferred embodiment of the present invention, it will be understood that changes may be made in size, shape or configuration of some of the parts without departing from the present invention as described in the appended claims.

What is claimed is:

1. A microfilm cassette for use with an optical projection device said cassette comprising
   a housing having wall portions and base portions defining first and second film storage chambers, and a passageway connecting said storage chambers, and a removable cover portion over said storage chambers and said passageway,
   a first and a second spool upon which microfilm can be wound, said spools being adapted for rotation within said first and second storage chambers respectively,
   friction discs positioned between said spools and said base portions of said storage chambers so as to afford a retarding force against the rotation of said spools,
   a film platen assembly positioned within said passageway, said platen assembly including a bracket member having parallel end portions, each of which has a longitudinal slot affording the transition of microfilm through said platen assembly, and an interconnecting side portion having a generally centrally located aperture disposed so as to afford the illumination of a framed segment of microfilm through said side portion, said side portion also having a pair of tab portions projecting outwardly from said bracket member, said platen assembly further including a glass plate assembly affixed to said side portion and extending along said side portion generally perpendicular to said end portions, said glass plate assembly comprising two glass plates spaced apart from each other by spacing means of a predetermined thickness in excess of the thickness of a given microfilm, said glass plate assembly being disposed between said longitudinal slots to support and position a microfilm transiting said platen assembly between said glass plates thus affording a predetermined film plane within said cassette, and
   means for supporting said platen assembly in said housing for movement transverse to said passageway.

2. A microfilm cassette as claimed in claim 1 wherein said glass plate assembly includes an anti-reflection coating on one of said glass plates affording the diminution of any prismatic coloration within the glass plate assembly.

3. A microfilm cassette as claimed in claim 1 wherein said glass plate assembly includes a hot mirror coating on one of said glass plates affording the diminution of heat transfer through said glass plate assembly.

4. A microfilm cassette as claimed in claim 1 wherein said means for supporting said platen assembly comprises spaced slots in said wall portions to slidably receive said tab portions.

5. In an optical projection device the combination of:
   a housing for a projection lens which housing includes a mounting surface which is parallel to the focal plane of said projection lens and perpendicular to its optical axis;
   a film cassette having a film platen assembly which includes a bracket member having parallel end portions, each of which has a longitudinal slot affording the transition of microfilm through said platen assembly, and an interconnecting side portion having a generally centrally located aperture disposed so as to afford the illumination of film through said side portion, said side portion also having a pair of tab portions projecting outwardly from said bracket member, said film platen assembly further including a glass plate assembly affixed to said side portion and extending along said side portion generally perpendicular to said end portions, said glass plate assembly comprising two glass plates spaced apart from each other by spacing means of a predetermined thickness in excess of the thickness of a given microfilm, said glass plate assembly being disposed between said longitudinal slots to support and position a microfilm transiting said platen assembly between said glass plates, thus affording a predetermined film plane within said cassette, wherein said film platen assembly has a predetermined surface which is parallel to said film plane;

biasing means disposed adjacent said tab portions so as to force said predetermined surface of said film platen assembly against said mounting surface of said lens housing thereby positioning said film plane parallel to said focal plane, and perpendicular to said optical center line.

* * * * *